US 6,657,746 B1

(12) United States Patent
Fuchigami et al.

(10) Patent No.: US 6,657,746 B1
(45) Date of Patent: Dec. 2, 2003

(54) LOOK-UP TABLE CONSTRUCTING METHOD AND COLOR CONVERSION APPARATUS

(75) Inventors: Takahiro Fuchigami, Yokosuka (JP); Takayuki Sawada, Tokyo (JP)

(73) Assignees: Kabushiki Kaisha Toshiba, Kawasaki (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/469,225

(22) Filed: Dec. 22, 1999

(30) Foreign Application Priority Data

Dec. 22, 1998 (JP) .......................... 10-365489

(51) Int. Cl.[7] .................. G06K 15/00; H04N 1/46
(52) U.S. Cl. .................. 358/1.9; 358/2.1; 358/523; 358/530
(58) Field of Search .................. 358/500, 522, 358/523, 1.9, 2.1; 382/162, 168

(56) References Cited

U.S. PATENT DOCUMENTS

| 5,515,172 A | 5/1996 | Shiau | 358/298 |
|---|---|---|---|
| 5,724,442 A | 3/1998 | Ogatsu et al. | 382/167 |
| 5,835,244 A * | 11/1998 | Bestmann | 358/523 |
| 6,292,195 B1 * | 9/2001 | Shimizu et al. | 345/431 |
| 6,323,969 B1 * | 11/2001 | Shimizu et al. | 358/523 |
| 2003/0147088 A1 * | 8/2003 | Kulkami | 358/1.9 |

FOREIGN PATENT DOCUMENTS

| JP | 60-220660 | 11/1985 |
|---|---|---|
| JP | 5-120416 | 5/1993 |
| JP | 5-284346 | 10/1993 |
| JP | 6-319040 | 11/1994 |
| JP | 7-226852 | 8/1995 |
| JP | 10-243250 | 9/1998 |
| JP | 11-103397 | 4/1999 |

* cited by examiner

Primary Examiner—Jerome Grant, II
(74) Attorney, Agent, or Firm—Foley & Lardner

(57) ABSTRACT

Not only one color conversion matrix is used for color conversion from a first color space to a second color space, but an appropriate color conversion parameter is calculated for each of a plurality of areas, into which the first color space is divided in advance. Further, an overlapping area is set between each set of adjacent ones of the divided areas of the first color space to construct a look-up table of a smaller conversion error.

10 Claims, 11 Drawing Sheets

(COLOR CONVERSION DATA BASE)

| NUMBER | ORIGINAL PIXEL VALUES | | | DESTINATION PIXEL VALUES | | | AREA NUMBER (1) | | | AREA NUMBER (2) | | | ... |
|---|---|---|---|---|---|---|---|---|---|---|---|---|---|
| | Ri | Gi | Bi | Co | Mo | Yo | FIRST | SECOND | THIRD | FIRST | SECOND | THIRD | |
| 1 | 0 | 0 | 0 | 255 | 255 | 255 | 1 | 1 | 1 | – | – | – | |
| 2 | x | x | x | y | y | y | | | | | | | |

BRIGHTNESS   CHROMA   HUE

GROUP1: CONVERSION MATRIX A
GROUP2: CONVERSION MATRIX B
GROUP3: CONVERSION MATRIX C
GROUP4: CONVERSION MATRIX D (COLOR SPACE DIVISION DATA BASE)

| | | | | | | | |
|---|---|---|---|---|---|---|---|
| FIRST COLOR SPACE DIVISION | FIRST ATTRIBUTE | BRIGHTNESS | BRIGHTNESS | BRIGHTNESS | BRIGHTNESS | BRIGHTNESS | BRIGHTNESS |
| | FIRST RANGE | [0~30] | [20~235] | [20~235] | [20~235] | [20~235] | [225~255] |
| | FIRST AREA NUMBER | 1 | 2 | 2 | 2 | 2 | 3 |
| SECOND COLOR SPACE DIVISION | SECOND ATTRIBUTE | CHROMA | CHROMA | CHROMA | CHROMA | CHROMA | CHROMA |
| | SECOND RANGE | [0~∞] | [0~30] | [20~∞] | [20~∞] | [20~∞] | [0~∞] |
| | SECOND AREA NUMBER | 1 | 1 | 2 | 2 | 2 | 1 |
| THIRD COLOR SPACE DIVISION | THIRD ATTRIBUTE | HUE | HUE | HUE | HUE | HUE | HUE |
| | THIRD RANGE | [0~2π] | [0~2π] | $[-\frac{\pi}{6} \sim \frac{5}{6}\pi]$ | $[\frac{\pi}{2} \sim \frac{3}{2}\pi]$ | $[\frac{7}{6}\pi \sim \frac{13}{6}\pi]$ | [0~2π] |
| | THIRD AREA NUMBER | 1 | 1 | 1 | 2 | 3 | 1 |
| WEIGHTING FACTOR | | 2 | 1 | 3 | 3 | 3 | 2 |
| CONVERSION MATRIX PARAMETER | | ※... | ※... | ※... | ※... | ※... | ※... |

※ ITEM "CONVERSION MATRIX PARAMETER" IS A DATA-FILLING AREA

FIG. 4

LOOK-UP TABLE CONSTRUCTING METHOD AND COLOR CONVERSION APPARATUS

BACKGROUND OF THE INVENTION

This invention relates to a look-up table constructing method to be used, for example, when forming and outputting a copy of an input color image, and a color conversion apparatus using the method.

In a color image processing system, color data input from an image input device, and color data output to an image output device is greatly influenced by the characteristics of the input and output devices. To eliminate such a difference in characteristics between the input and output devices, color conversion from input color data to output color data is implemented, using maps in different color spaces.

Suppose that input color pixel values Ri, Gi and Bi from a scanner are converted into output color pixel values Co, Mo and Yo to be output to a printer, using an RGB color system as an original color space, and a CMY color system as a destination color space. This conversion can be realized by a color conversion method using a matrix operation, which is expressed by, for example, the following formula (1) or (2):

$$\begin{bmatrix} C_0 \\ M_0 \\ Y_0 \end{bmatrix} = \begin{bmatrix} a_{00} & a_{01} & a_{02} \\ a_{10} & a_{11} & a_{12} \\ a_{20} & a_{21} & a_{22} \end{bmatrix} \begin{bmatrix} R_i \\ G_i \\ B_i \end{bmatrix} \quad (1)$$

$$\begin{bmatrix} C_0 \\ M_0 \\ Y_0 \end{bmatrix} = \begin{bmatrix} a_{00} & a_{01} & a_{02} & a_{03} & a_{04} & a_{05} & a_{06} & a_{07} & a_{08} & a_{09} \\ a_{10} & a_{11} & a_{12} & a_{13} & a_{14} & a_{15} & a_{16} & a_{17} & a_{18} & a_{19} \\ a_{20} & a_{21} & a_{22} & a_{23} & a_{24} & a_{25} & a_{26} & a_{27} & a_{28} & a_{29} \end{bmatrix} \begin{bmatrix} R_i \\ G_i \\ B_i \\ R_i^2 \\ G_i^2 \\ B_i^2 \\ R_i G_i \\ G_i B_i \\ B_i R_i \\ 1 \end{bmatrix} \quad (2)$$

To obtain the output color pixel values Co, Mo and Yo from the input color pixel values Ri, Gi and Bi, using the color conversion processing section, there is another method wherein a look-up table (LUT) as shown in FIG. 12, which is constructed in advance using a matrix operation expressed by the formula (1) or (2), is referred to, instead of executing the matrix operation.

The LUT used in the method is constituted of multi-dimensional coordinate values (lattice points) in the original color space and corresponding multi-dimensional coordinate values (lattice points) in the destination color space. If the color pixel values Ri, Gi and Bi input to the color conversion processing section exist as values of an original pixel in the LUT, output pixel values Co, Mo and Yo as conversion results can be obtained directly from the LUT. If, on the other hand, the color pixel values Ri, Gi and Bi input to the color conversion processing section do not exist as values of an original pixel in the LUT, conversion from the input pixel values to output pixel values is performed by interpolation or extrapolation using a point of pixel values existing in the LUT.

However, it is difficult to sufficiently reflect non-linear characteristics in color space conversion by uniformly executing the matrix operation over the entire color space.

In light of this, there is a method in which a plurality of conversion matrices are prepared in advance, and the matrix operation is executed using one conversion matrix selected therefrom in accordance with pixel values Ri, Gi and Bi input to the color conversion processing section.

If in the conventional color conversion performed with reference to the LUT, the look-up table LUT to be referred to when color conversion is performed from a first color space (i.e. the original color space) to a second color space (i.e. the destination color space) is constructed using only one type of conversion matrix parameter, it is possible that there will be great differences between output pixel values and the original pixel values because of the non-linear correspondence between the original color space and the destination color space. In particular, it is possible that the hue will vary between the input pixel values and the output pixel values, which is a great disadvantage.

Moreover, in the aforementioned method using selected one of conversion matrices prepared in advance, a large amount of operation is executed since conversion matrix determining processing and the matrix operation are performed on each of the pixel values Ri, Gi and Bi input to the color conversion processing section. In addition, discontinuity of conversion matrices used in units of one pixel input to the color conversion processing section may degrade color reproductivity of an output color image. Executing an operation for correcting the reproductivity further increases the amount of the entire operation.

BRIEF SUMMARY OF THE INVENTION

It is the object of the invention to provide a method for constructing a color conversion LUT that can reduce the amount of operation performed in color conversion processing, and can correctly reflect the non-linear characteristics in the correspondence between an original color space and a destination color space.

According to an aspect of the invention, there is provided a method of constructing a look-up table to be referred to when converting color information of a lattice point in a first color space, into color information of a lattice point in a second color space, comprising the steps of: defining first divided areas by dividing the first color space on the basis of a first color attribute selected from brightness, chroma and hue, using at least one optionally designated first reference value; defining second divided areas by dividing each of the first divided areas on the basis of a second color attribute selected from brightness, chroma and hue and different from the first color attribute, using at least one optionally designated second reference value; dividing each of the second divided areas into third divided areas on the basis of a color attribute selected from the brightness, chroma and hue and different from the first and second color attributes, using at least one optionally designated third reference value; calculating and providing an appropriate conversion matrix parameter for each of the third divided areas, the appropriate conversion matrix parameter being used to execute conversion from the first color space to the second color space; and constructing, using the provided conversion matrix parameters, a look-up table that indicates a correspondence relationship between lattice points in the first color space and lattice points in the second color space.

Thus, the first color space is divided into a plurality of areas on the basis of the brightness, chroma and hue of each lattice point, and an appropriate conversion parameter is calculated for each divided area. Accordingly, a conversion error which will occur when converting the pixel values of a lattice point from the first color space to the second color space can be minimized.

The step of defining the first divided areas includes the step of dividing the first color space into a plurality of areas such that an overlapping area is formed between adjacent divided areas; the step of calculating the appropriate conversion matrix parameter includes the step of calculating and providing appropriate conversion matrix parameters and weighting factors for those respective ones of the second divided areas, to which a target lattice point belongs; and the step of constructing the look-up table includes the step of calculating, when a plurality of conversion matrix parameters and weighting factors are provided for one target lattice point, a weighted mean of all color information items used in the second color space and corresponding to the one target lattice point, using the conversion matrix parameters and the weighting factors. Thus, inconsistency of the tone of reproduced color in the areas of the second color space can be further suppressed. In other words, the invention can construct a look-up table (LUT1) of a small conversion error.

According to another aspect of the invention, there is provided a color conversion apparatus for constructing a look-up table to be referred to when converting color information of a lattice point in a first color space, into color information of a lattice point in a second color space, and for converting color information in the first color space into color information in the second color space with reference to the constructed look-up table, comprising: first defining means for defining first divided areas by dividing the first color space on the basis of one of color attributes and at least one optionally designated first reference value; second defining means for defining second divided areas by dividing each of the first divided areas defined by the first defining means, on the basis of one of color attributes and at least one optionally designated second reference value; calculation means for calculating an appropriate conversion matrix parameter for each of the second divided areas defined by the second defining means, the appropriate conversion matrix parameter being used to execute conversion from the first color space to the second color space; LUT constructing means for constructing a look-up table for each of the second divided areas, using the calculated conversion matrix parameter; and means for converting color information in the first color space into color information in the second color space with reference to the look-up table constructed by the LUT constructing means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a view illustrating an example of a color space divided pattern registered in a color space division data base 3;

DETAILED DESCRIPTION OF THE INVENTION

Reference will now be made in detail to the presently preferred embodiment of the invention as illustrated in the accompanying drawings. In color conversion executed in the embodiment, an RGB color space and a CMY color space are treated as an input color space (an original color space) and an output color space (a destination color space), respectively. It is a matter of course that any types of color systems may be used as the original color space and the destination color space. In the following description, if not specified otherwise, terms related to positions, such as "point", "coordinates", "space", etc., relate to the input color space. Further, the invention is also applicable to a notation method other than the method using position information, such as coordinates, as color notation information for the input and output color spaces.

Figure 1:
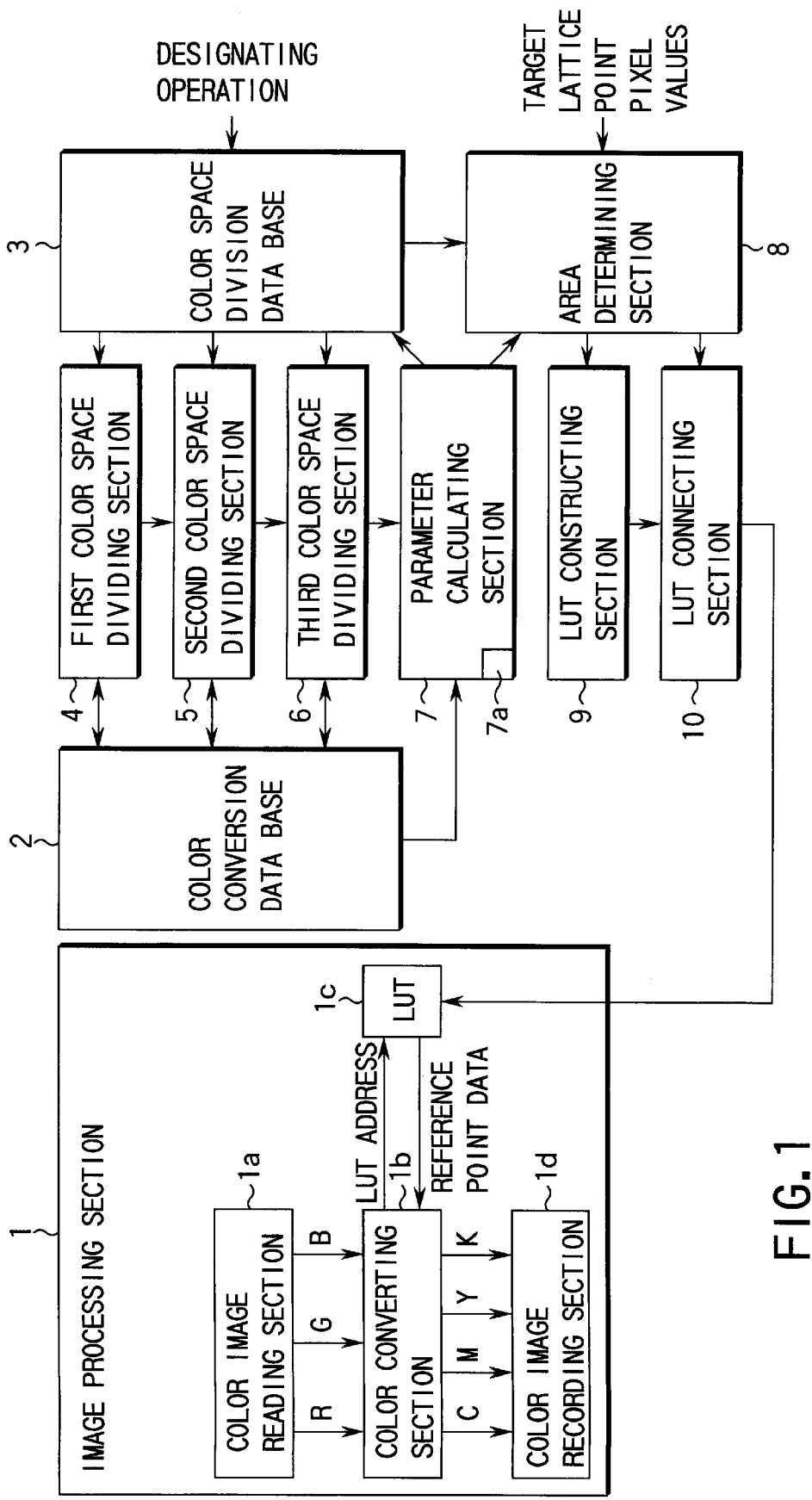
FIG. 1 is a schematic block diagram illustrating the entire structure of an image forming apparatus that employs a color conversion apparatus according to the embodiment of the invention.

FIG. 1 schematically shows the entire structure of an image forming apparatus that incorporates a color conversion apparatus according to the embodiment of the invention. This structure mainly includes an image processing section 1 and various types of processing sections 2–10 incorporated in the section 1 for constructing a look-up table (hereinafter referred to as an "LUT").

The image processing section 1 comprises a color image reading section 1a, a color converting section 1b, an LUT 1c and a color image recording section 1d. The color image reading section 1a converts, using, for example, a CCD, light reflected from a color image as an original document, into electric signals corresponding to light colors R (red), G (green) and B (blue) as the three primary colors of light, for each of fine areas that do not overlap (hereinafter referred to as "pixels"), thereby outputting R, G or B digital data as first color data in units of one pixel.

The color converting section 1b inputs R, G or B digital data output as the first color data from the color image reading section 1a, converts it, in units of one pixel, into second color data C, M, Y or K as digital data corresponding to the amount of ink of three primary colors used for printing, such as cyan (C), magenta (M) and yellow (Y), and if necessary, black ink (K) used as an auxiliary.

The LUT 1c is a look-up table that stores CMY color data corresponding to RGB color data, and is constructed in the present invention.

The color converting section 1b obtains an intra-LUT address assigned to CMY color data corresponding to input RGB color data. The color converting section 1b also reads CMY color data with the address from the LUT 1c, and if necessary, subjects the CMY color data to interpolation processing, thereby outputting it to the color image recording section 1d.

The color image recording section 1d forms an image by attaching an appropriate amount of C, M, Y and/or K ink to a sheet of paper in accordance with second color data CMYK output from the color converting section 1b, thereby outputting the image.

The LUT 1c must be constructed prior to the actual image processing executed in the image processing section 1. The processing section for constructing the LUT includes a color conversion data base 2, a color space division data base 3, a first color space dividing section 4, a second color space dividing section 5, a third color space dividing section 6, a parameter calculating section 7, an area determining section 8, an LUT constructing section 9 and an LUT connecting section 10.

The color conversion data base 2 stores a predetermined number of sets of conversion data pieces that consist of input color data (pixel values) of predetermined numerical values and corresponding converted color data (pixel values). Further, the color conversion data base 2 can add the area number of a divided area to which each original pixel belongs, using the first color space dividing section 4, the second color space dividing section 5 and the third color space dividing section 6.

The designer can designate an input color space dividing pattern, using the color space division data base 3. The color space division data base 3 provides information necessary for color space division to the first color space dividing section 4, the second color space dividing section 5 and the third color space dividing section 6, which are located downstream of the data base 3 with respect to the flow of processing. The selection of a dividing pattern can be also performed manually.

The first color space dividing section 4 divides the input color space into a plurality of areas on the basis of one of the three attributes of color, i.e. brightness, chroma and hue, using one or more optionally designated reference values. The section 4 also sets an overlapping area between adjacent divided areas.

The chroma (C) can be calculated using, for example, the following equation (3):

$$C=\{(a^*)^2+(b^*)^2\}^{1/2} \quad (3)$$

R, G and B can be converted into L*, a* and b* in the following manner.

First, input pixel values Ri, Gi and Bi are converted into the three stimulus values X, Y and Z of an XYZ color system, using the following equation.

$$\begin{bmatrix} X \\ Y \\ Z \end{bmatrix} = \begin{bmatrix} 2.7689 & 1.7517 & 1.1302 \\ 1.0000 & 4.5907 & 0.0601 \\ 0.0000 & 0.0565 & 5.5943 \end{bmatrix} \begin{bmatrix} R_i \\ G_i \\ B_i \end{bmatrix}$$

Then, the values of L*, a* and b* are calculated as follows:

$L^*=116 \cdot f(Y/Yn)-16$ $a^*=500 \cdot \{f(X/Xn)-f(Y/Ym)\}$ $b^*=200 \cdot \{f(X/Xn)-f(Z/Zm)\}$ Provided that $$f(x) = \begin{cases} x^{\frac{1}{2}} (x > 0.008856) \\ 7.787x + \frac{16}{116} (x \leq 0.008856) \end{cases}$$

Further, Xn, Yn and Zn are three stimulus values corresponding to pixel values assumed when the reflectance is 100% (in this case, the reflectance of white paper).

The chroma can also be calculated by another method for obtaining a difference between maximum and minimum ones of the three values of R, G and B.

The brightness can be calculated by, for example, a method for obtaining a maximum one of the three values of R, G and B, or by a method for obtaining a linear sum of the three values.

The hue (H) can be calculated by, for example, the following equation (4):

$$H = \frac{\pi}{3}\left(\frac{p}{\max(R, G, B) - \min(R, G, B)} + q\right) \quad (4)$$

where max (R, G, B) represents the maximum value of the three color values, min (R, G, B) represents the minimum value of the three color values. Further, supposing that n is an optical real value, p=G−B and q=n when max (R, G, B)=R, p=B−R and q=n+2 when max (R, G, B)=G, and p=R−G and q=n +4 when max (R, G, B)=B.

The second color space dividing section 5 divides each area of the input color space, divided by the first color space dividing section 4, into a plurality of areas on the basis of one of the three attributes of color, i.e. brightness, chroma and hue. The section 5 also sets an overlapping area between adjacent divided areas.

The third color space dividing section 6 divides each area of the input color space, divided by the first color space dividing section 4 and also by the second color space dividing section 5, into a plurality of areas on the basis of one of the three attributes of color, i.e. brightness, chroma and hue. The section 6 also sets an overlapping area between adjacent divided areas.

A description will be given of an example of an input color space dividing method using a combination of the first color space dividing section 4, the second color space dividing section 5 and the third color space dividing section 6. In this method, a highlight area and a dark area are separated from a middle-brightness area on the basis of their brightness values (first color space division), then the middle-brightness area is divided into a chromatic color area and an achromatic color area on the basis of their chroma values (second color space division), and the chromatic color area is divided into a plurality of areas on the basis of their hue values (third color space division). In a specific method for performing division based on the brightness, an area which includes a lattice point whose maximum RGB value is lower than an optionally set first reference value is designated as the dark area, while an area which includes a lattice point whose minimum RGB value is higher than the first reference value is designated as the highlight area.

The parameter calculating section 7 calculates statistically most appropriate conversion matrix parameters used in, for example, the equation (1) or (2), by extracting a set of conversion data pieces in each divided area from the color conversion data base 2, and then applying the least square method thereto.

The area determining section 8 determines, with reference to the color space division data base 3, to which divided area a target lattice point set in the input color space belongs, and supplies the LUT constructing section 9 located downstream of the section 8 with the pixel values of the target lattice point and a conversion matrix parameter (or parameters) for a divided area (or areas) to which the lattice point (i.e. pixel) belongs. Further, the section 8 supplies the LUT connecting section 10 located downstream of it with a weighting factors for the divided areas to which the pixel of the target lattice point belongs.

The LUT constructing section 9 converts the pixel values of the target lattice point supplied from the area determining section 8, using the conversion matrix parameter for each divided area supplied from the area determining section 8, and supplies the LUT connecting section 10 located downstream of it, with the pixel values of the target lattice point and the values of one or more destination pixels corresponding to the target lattice point.

When the values of one destination pixel is supplied from the LUT constructing section 9 for the pixel values of one target lattice point, the LUT connecting section 10 sets the values of the destination pixel as destination pixel values corresponding to the pixel values of the target lattice point, and supplies them to the image processing section. The values of this destination pixel are registered in the LUT 1c. On the other hand, when the values of a plurality of destination pixels are supplied from the LUT constructing section 9 for the pixel values of one target lattice point, the LUT connecting section 10 calculates the weighted mean of corresponding ones of the values of all the destination pixels, using weighting factors each assigned to a corresponding one of the divided areas. Then, the LUT connecting section 10 sets the weighted means as the values of a destination pixel corresponding to the target lattice point, and supplies them to the image processing section. The values of the destination pixel are registered in the LUT 1c.

Supposing that a number N of destination pixels t1, t2, . . . , tN and a number N of weighting factors w1, w2, . . . , wN are supplied from the LUT constructing section 9 and the area determining section 8, respectively, the weighted mean T of the N destination pixel values is given by the following equation (5):

$$T = \frac{W_1 t_1 + W_2 t_2 + \ldots + W_N t_N}{W_1 + W_2 + \ldots + W_N} \quad (5)$$

The weighted mean calculation is executed for each component (C, M, Y) in the destination CMY color space.

As well as the above method, LUTs constructed in respective divided areas can be also connected by a method in which each overlapping area between adjacent divided areas is added to a corresponding divided area only when calculating a conversion matrix parameter (parameters). This LUTs connection can be also realized by a method in which a conversion matrix parameter is obtained for each divided area that has an overlapping area with another area adjacent thereto, and the appropriate one is selected from the conversion matrix parameters, which can provide pixel values most similar to the values of each destination pixel registered in the color conversion data base 2.

Each processing section will be described in detail.

Figures 2, 3:
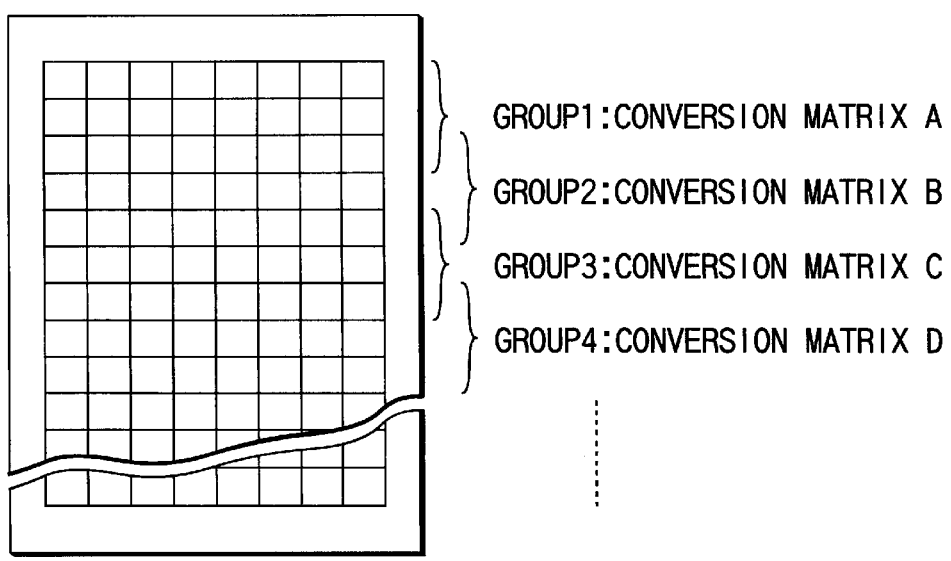
FIG. 2 is a view showing the format of a color conversion data base 2 and examples of a set of registered conversion data pieces.
FIG. 3 is a view showing a color patch printed by a printer to which the invention is applied.

FIG. 2 shows the format of the color conversion data base 2 and examples of a set of conversion data pieces. A method for registering the values of original pixels and the values of destination pixels includes the step of printing, by a printer, a color patch of plural colors as shown in FIG. 3 on the basis of a plurality of CMY data pieces (Co, Mo, Yo) prepared in advance, and the step of reading the printed color patch by a scanner, obtaining Ri, Gi and Bi data corresponding to colors indicated by respective CMY data pieces, and recording their correspondence relationship in the color conversion data base.

A set of the values of an original pixel and the values of a corresponding destination pixel will be referred to as "a set of conversion data pieces". A predetermined number (corresponding, for example, to the number of colors used in the color patch shown in FIG. 3) of sets of conversion data pieces included in the actually used range of the color space are recorded in advance in the color conversion data base as described above. Specifically, each pixel value, obtained by reading a color patch as shown in FIG. 3 by a color scanner, is stored in a corresponding one of all boxes for the values of each original pixel and the values of a corresponding destination pixel, as is shown in FIG. 2. Data in a plurality of area number sections can be written at any time, and the number of the sections corresponds to a maximum number of areas to which one original pixel can belong.

FIG. 4 shows an example of a color space divided pattern stored in the color space division data base 3. The color space division data base 3 stores a plurality of different color space divided patterns. The area numbers are independently set by the first to third color space dividing sections 4, 5 and 6. The finally set divided areas are distinguished from each other by respective combinations (e.g. 2-2-1) of three area numbers. As described above, the color space division data base 3 prestores several types of color space divided patterns similar to a pattern shown in FIG. 4, so that an operator can designate one of the patterns. In the color space division data base 3, only the conversion matrix parameter item is a data filling area, while the other items are already-data-determined areas, as is shown in FIG. 4.

Figure 5:
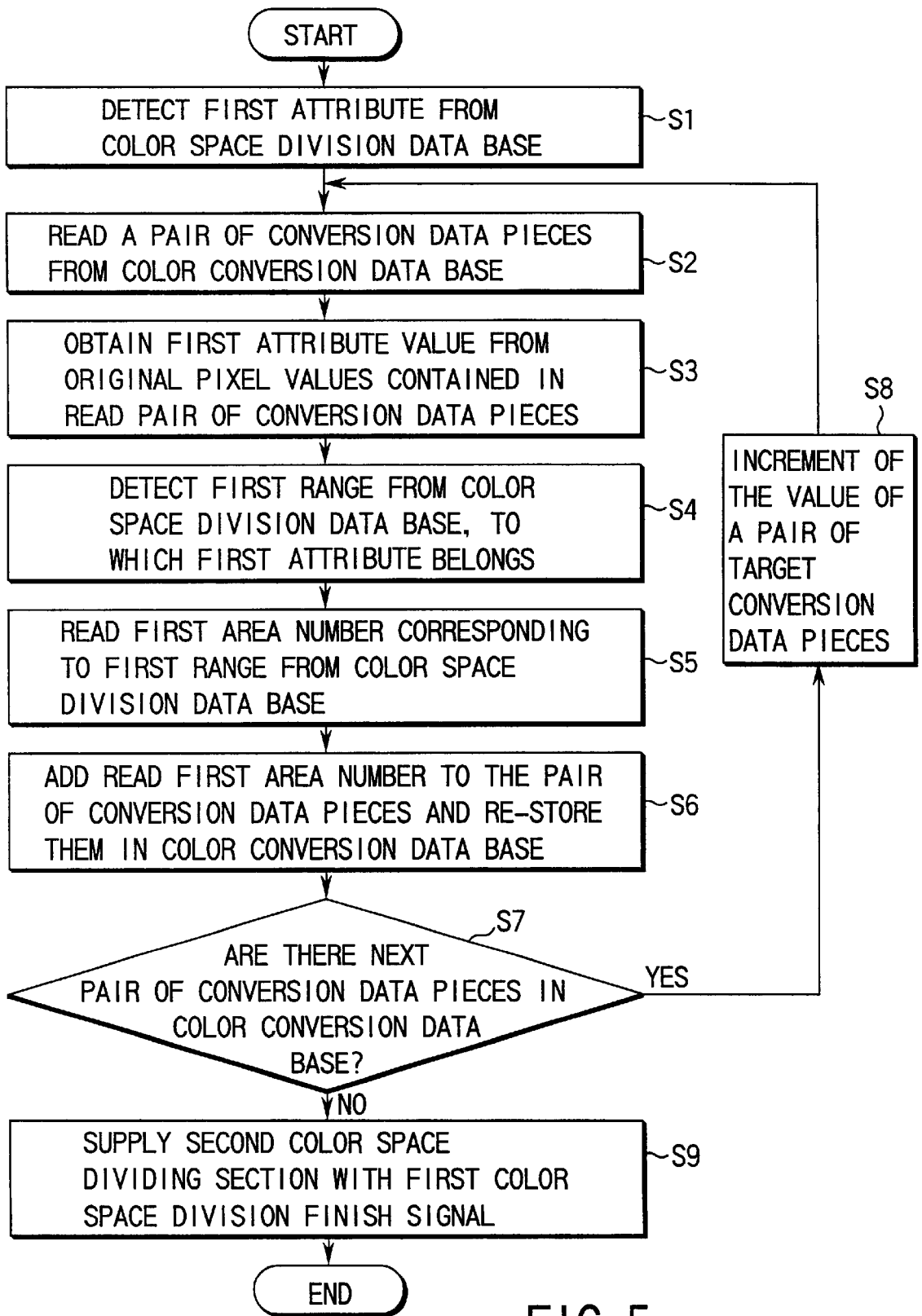
FIG. 5 is a flowchart useful in explaining means for dividing an original color space, which is incorporated in a first color space dividing section 4.

Referring to the flowchart of FIG. 5, the operation of the first color space dividing section 4 will be described. First, the first color space dividing section 4 detects the attribute of first color space division from the item "first attribute" of the color space division data base 3 of FIG. 4 (step S1). Subsequently, the first color space dividing section 4 reads a set of conversion data pieces from sets of conversion data pieces (each set consisting of the values of an original pixel and the values of a corresponding destination pixel) stored in order in the color conversion data base 2 (step S2), and obtains a first attribute value ("brightness" in this case) from the values of an original pixel contained in the read set of conversion data pieces (step S3). The first color space dividing section 4 then detects a divided area to which the original pixel belongs, from the first attribute value on the basis of the item "first range" (step S4). After that, the first color space dividing section 4 adds a "first area number" corresponding to the divided area, as additional information for the read set of conversion data pieces, to the color conversion data base 2 of FIG. 2 (steps S5 and S6).

If, for example, the brightness value calculated from the values Ri, Gi and Bi of an original pixel is 10, the first area number is determined to be 1 (see FIG. 4), and "1" is recorded in the "first" box of an area number section (1) in FIG. 2 corresponding to the original pixel values Ri, Gi and Bi. If the calculated brightness value is 25, the first area number is determined to be 1 and 2 since the value belongs to two ranges as shown in FIG. 4. Accordingly, "1" is recorded in the first box of the area number section (1) of FIG. 2, and "2" is recorded in the first box of an area number section (2).

If the color conversion data base 2 of FIG. 2 stores the next set of conversion data pieces, the processing at the steps S2–S6 is repeated for the next set of conversion data pieces (steps S7 and S8). If, on the other hand, the data base 2 stores no more sets of conversion data pieces, a signal (a first color space division finish signal) indicating that the first color space division has been finished is sent to the second color space dividing section 5 located downstream of the section 4 (step S9).

Figure 6:
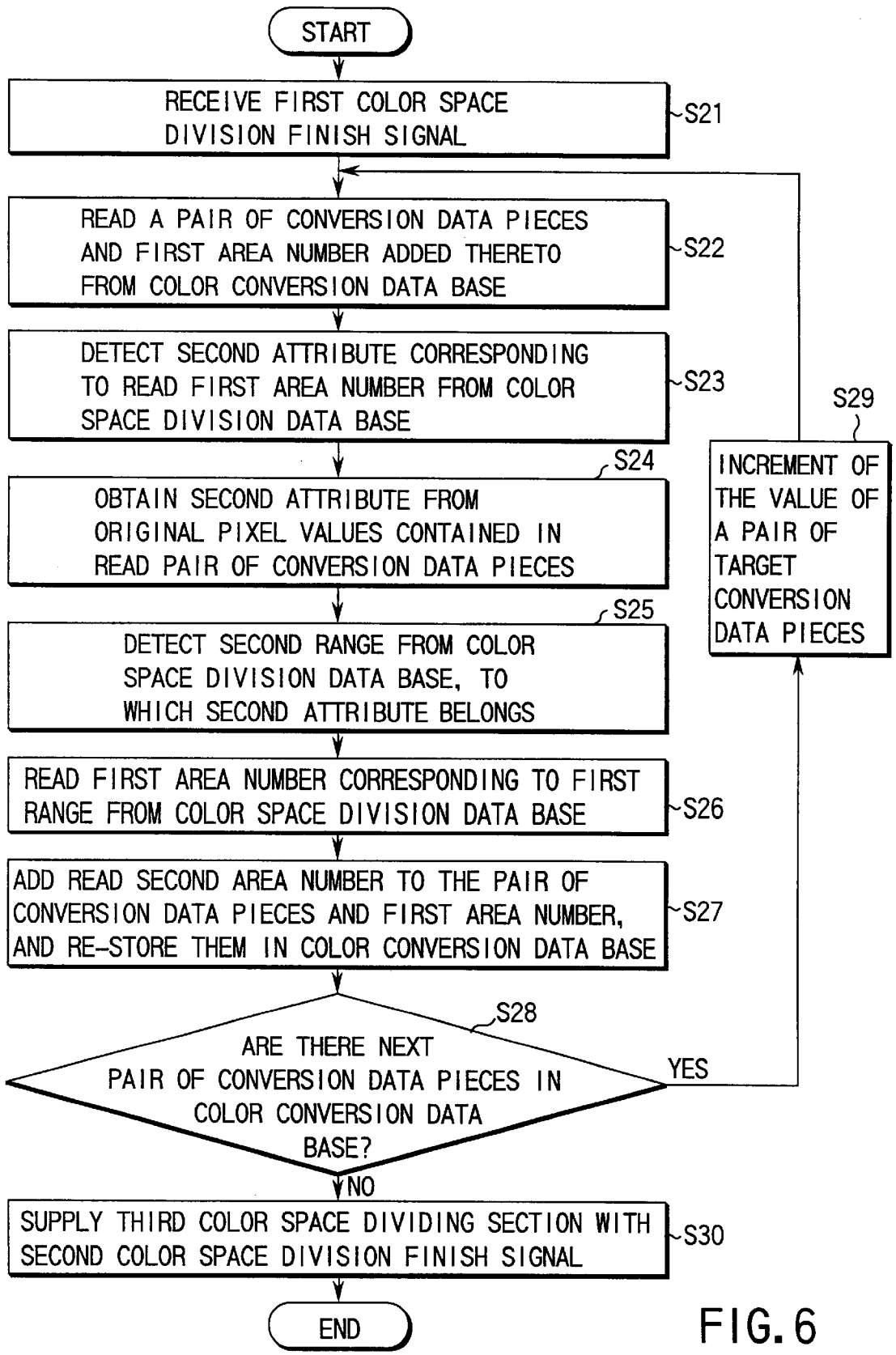
FIG. 6 is a flowchart useful in explaining the re-dividing procedure of a second color space dividing section 5 for re-dividing each area of the original color space divided by the first color space dividing means.

Referring then to the flowchart of FIG. 6, the operation of the second color space dividing section 5 will be described. First, the second color space dividing section 5 receives the first color space division finish signal from the first color space dividing section 4 (step S21), and reads a set of conversion data pieces from the sets of conversion data pieces stored in order in the color conversion data base 2, and also the first area number assigned thereto (step S22). Then, the second color space dividing section 5 detects the attribute of the second color space division corresponding to the first area number, from the item "second attribute" of the color space division data base 3 of FIG. 4 (step S23), and obtains a second attribute value from the values of an original pixel contained in the read set of conversion data pieces (step S24). The second color space dividing section 5 then detects a divided area to which the original pixel belongs, from the second attribute value on the basis of the item "second range" (step S25). After that, the second color space dividing section 5 adds a "second area number" corresponding to the divided area, as additional information for the read set of conversion data pieces and the first area number, to the color conversion data base 2 (steps S26 and S27).

If, for example, the first area number added to the set of conversion data pieces is 1, the second area number is determined to be 1, since the second attribute is "chroma" and the second range is "0 to ∝" as shown in FIG. 4. Accordingly, "1" is recorded in the second box of the area number section (1) in the color conversion data base 2 of FIG. 2, which corresponds to the values of the original pixel.

If the first area number added to the set of conversion data pieces is 2, the second color space dividing section 5 calculates the degree of chroma from the values Ri, Gi and Bi of the original pixel, since the second attribute is also "chroma" as shown in FIG. 4. If the calculated chroma is, for example, 10, the second area number is determined to be 1, and "1" is recorded in the second box of the area number section (2). On the other hand, if the first area number is 2 and the calculated chroma is, for example, 25, the second area number is determined to be 1 and 2, and accordingly, "1" and "2" are recorded in the second box of the area number section (1) and the second box of the area number section (2) in FIG. 2, respectively.

If the color conversion data base 2 of FIG. 2 stores the next set of conversion data pieces, the processing at the steps S22–S27 is repeated for the next set of conversion data pieces (steps S28 and S29). If the data base 2 stores no more sets of conversion data pieces, a signal (a second color space division finish signal) indicating that the second color space division has been finished is sent to the third color space dividing section 6 located downstream of the section 5 (step S30).

Figure 7:
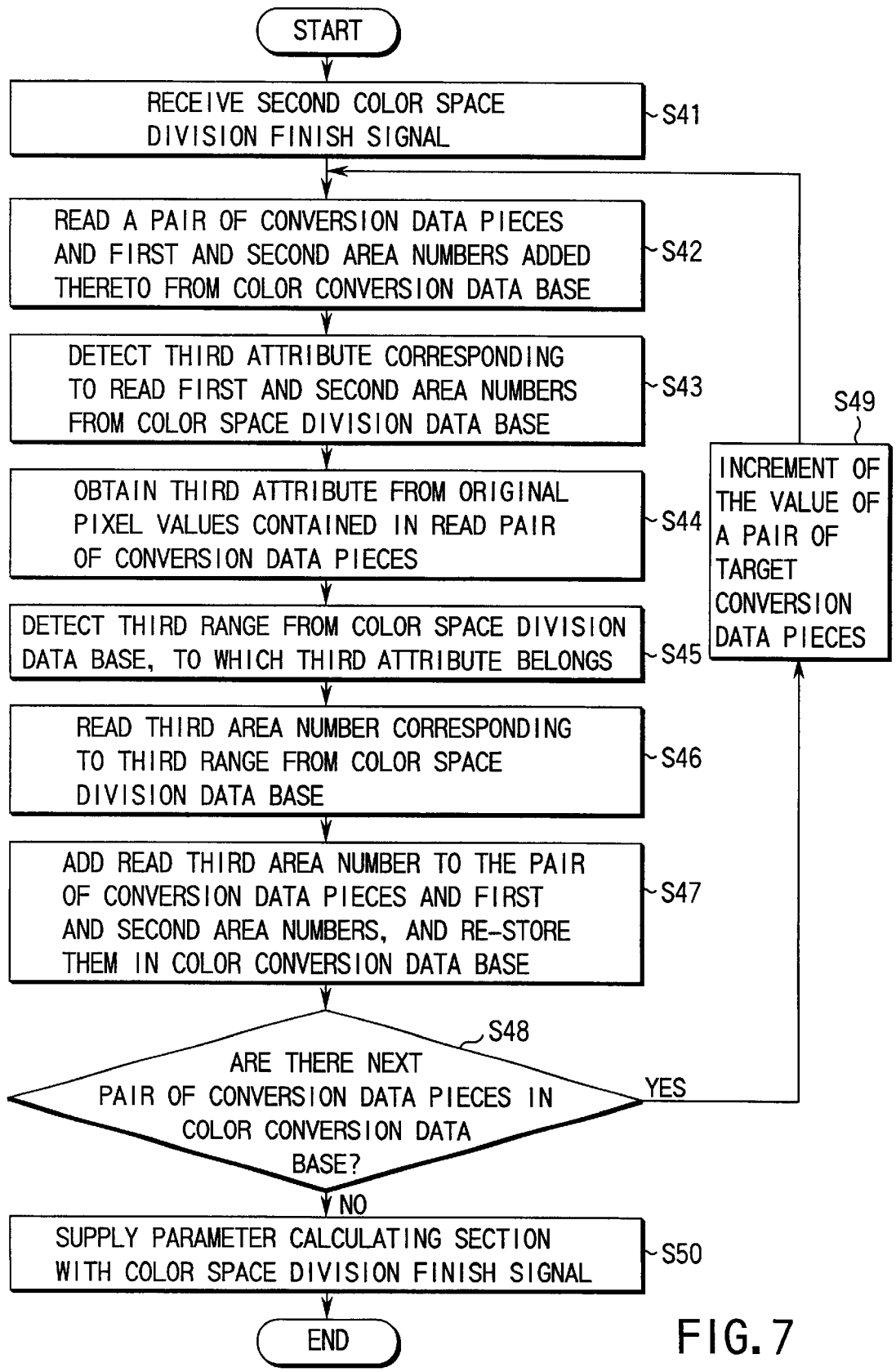
FIG. 7 is a flowchart useful in explaining the re-dividing procedure of a third color space dividing section 6 for re-dividing each area of the original color space divided by the second color space dividing means.

Referring then to the flowchart of FIG. 7, the operation of the third color space dividing section 6 will be described. First, the third color space dividing section 6 receives the second color space division finish signal from the second color space dividing section 5 (step S41), and reads a set of conversion data pieces from the sets of conversion data pieces stored in order in the color conversion data base 2, and also the first and second area numbers assigned thereto (step S42). Then, the third color space dividing section 6 detects the attribute of "third color space division" corresponding to the first and second area numbers, from the item "third attribute" of the color space division data base 3 of FIG. 4 (step S43), and obtains a third attribute value from the values of an original pixel contained in the read set of conversion data pieces (step S44). The third color space dividing section 6 then detects a divided area to which the original pixel belongs, from the second attribute value on the basis of the item "third range" (step S45). After that, the third color space dividing section 6 adds a "third area number" corresponding to the divided area, as additional information for the read set of conversion data pieces and the first and second area numbers, to the color conversion data base 2 (steps S46 and S47).

If, for example, both the first and second area numbers added to the set of conversion data pieces are 1, the third area number is determined to be 1, since the third attribute is "hue" and the third range is 0 to $2\pi$ as shown in FIG. 4. Accordingly, "1" is recorded in the third box of the area number section (1) in FIG. 2 corresponding to the set of conversion data pieces.

Further, if the first and second area numbers are each 2, the degree of hue is calculated from the values of the original pixel since the third attribute is "hue". If the calculated hue is $\pi/6$, the third area number is determined to be "1", and accordingly "1" is recorded in the third box of the area number section (1) in FIG. 2 corresponding to the set of conversion data pieces. Similarly, if the first and second area numbers are each 2, the calculated hue is $4\pi/6$, the third area number is determined to be 1 and 2, and accordingly, "1" and "2" are recorded in the third box of the area number section (1) in FIG. 2 corresponding to the set of conversion data pieces, and in the third box of the area number section (2), respectively.

If the color conversion data base 2 of FIG. 2 stores the next set of conversion data pieces, the processing at the steps S42–S47 is repeated for the next set of conversion data pieces (steps S48 and S49). If the data base 2 stores no more sets of conversion data pieces, a signal (a third color space division finish signal) indicating that the third color space division has been finished is sent to the parameter calculating section 7 located downstream of the section 6 (step S50).

Figure 8:
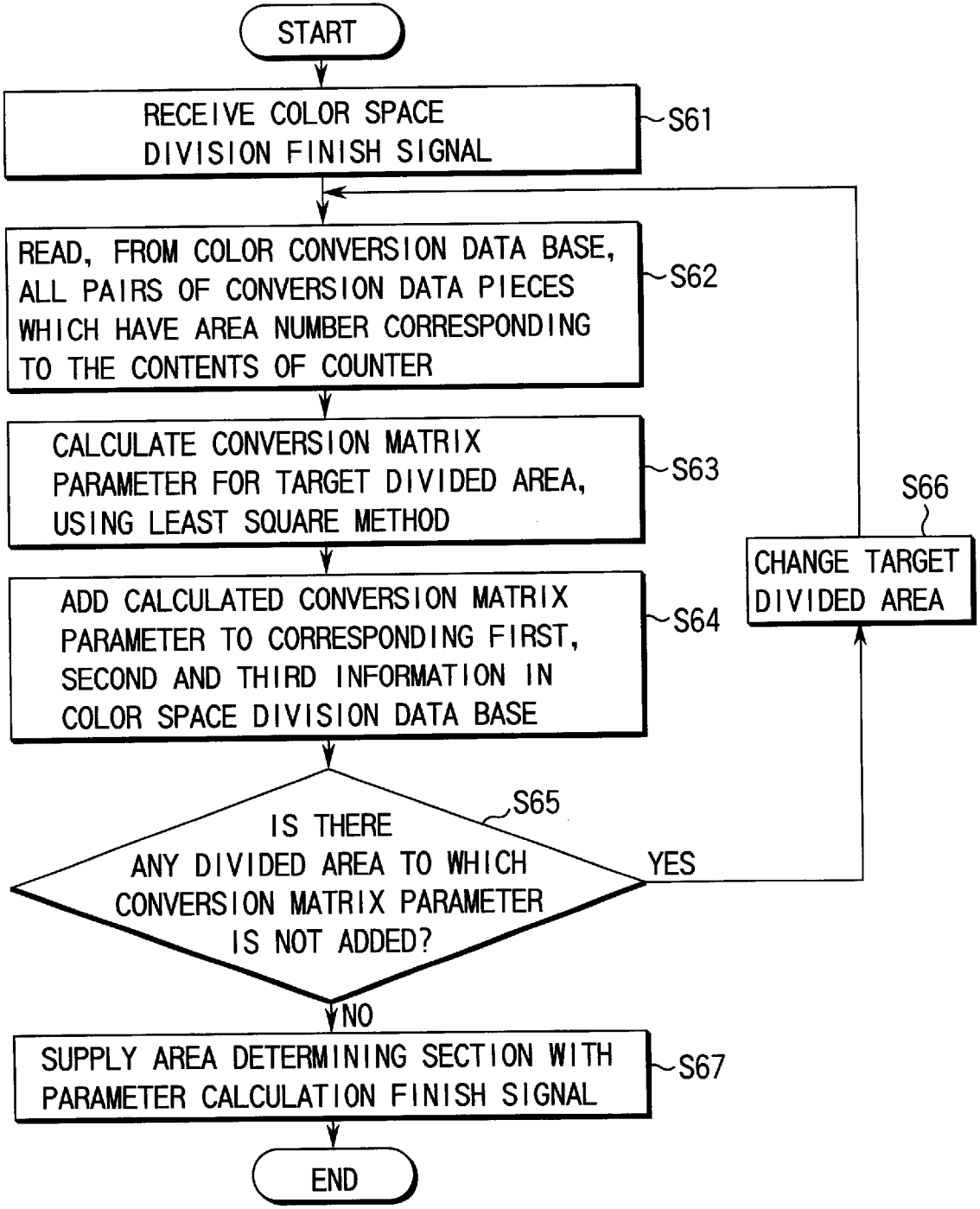
FIG. 8 is a flowchart useful in explaining the conversion matrix parameter calculating procedure of a parameter calculating section 7 in each divided area of the original color space.

Referring now to the flowchart of FIG. 8, the operation of the parameter calculating section 7 will be described. First, the parameter calculating section 7 receives the third color space division finish signal from the third color space dividing section 6 (step S61), and reads, from the color conversion data base 2 of FIG. 2, all sets of conversion data pieces, to which an area number corresponding to the contents of an area number counter 7a is assigned (step S62). The default values of the area number counter 7a are preset at "1, 1, 1". The parameter calculating section 7 calculates, using the least square method, a conversion matrix parameter for a divided area corresponding to the area number (step S63), and supplies the color space division data base 3 of FIG. 4 with the calculated conversion matrix parameter as additional information for the area number (step S64).

If the color space division data base 3 contains any area number to which no conversion matrix parameter is assigned yet, the parameter calculating section 7 changes the contents of the area number counter 7a to change the target divided area (steps S65 and S66). The parameter calculating section 7 repeats the processing at the steps S62–S64 on a divided area corresponding to the area number with no conversion matrix parameter. If it is determined at the step S65 that any divided area without a conversion matrix parameter does not exist, the parameter calculating section 7 supplies the area determining section 8 located downstream of the section 7 with a signal (a parameter calculation finish signal) indicating that parameter calculation has been finished (step S67). The conversion matrix parameter calculation method using the least square method is as follows:

The following matrix operation is now executed.

$$\begin{bmatrix} C_{\overline{0}} \\ M_{\overline{0}} \\ Y_{\overline{0}} \end{bmatrix} = \begin{bmatrix} a_{00} & a_{01} & a_{02} \\ a_{10} & a_{11} & a_{12} \\ a_{20} & a_{21} & a_{22} \end{bmatrix} \begin{bmatrix} R_i \\ G_i \\ B_i \end{bmatrix} = A \cdot \begin{bmatrix} R_i \\ G_i \\ B_i \end{bmatrix}$$

Suppose that there exist the following three sets of conversion data pieces:

$$\begin{bmatrix} C_{\overline{0}1} \\ M_{\overline{0}1} \\ Y_{\overline{0}1} \end{bmatrix} \cdots \begin{bmatrix} R_{i1} \\ G_{i1} \\ B_{i1} \end{bmatrix}, \begin{bmatrix} C_{\overline{0}2} \\ M_{\overline{0}2} \\ Y_{\overline{0}2} \end{bmatrix} \cdots \begin{bmatrix} R_{i2} \\ G_{i2} \\ B_{i2} \end{bmatrix}, \begin{bmatrix} C_{\overline{0}3} \\ M_{\overline{0}3} \\ Y_{\overline{0}3} \end{bmatrix} \cdots \begin{bmatrix} R_{i3} \\ G_{i3} \\ B_{i3} \end{bmatrix}$$

At this time, the following equation is established:

$$\begin{bmatrix} C_{\overline{0}1} & C_{\overline{0}2} & C_{\overline{0}3} \\ M_{\overline{0}1} & M_{\overline{0}2} & M_{\overline{0}3} \\ Y_{\overline{0}1} & Y_{\overline{0}2} & Y_{\overline{0}3} \end{bmatrix} = A \cdot \begin{bmatrix} R_{i1} & R_{i2} & R_{i3} \\ G_{i1} & G_{i2} & G_{i3} \\ B_{i1} & B_{i2} & B_{i3} \end{bmatrix}$$

If in this equation, Y=A·X, the following equation is obtained:

$$y \cdot X^T = A \cdot X \cdot X^T$$

$$\therefore A = Y \cdot X^T \cdot (X \cdot X^T)^{-1}$$

where $X^T$ is a transported matrix of X.

Using this equation, each element $a_{mn}$ of a conversion matrix A is represented by $C_{\overline{ox}}$, $M_{\overline{ox}}$, $Y_{\overline{ox}}$, $R_{ix}$, $G_{ix}$ and $B_{ix}$.

Figure 9:
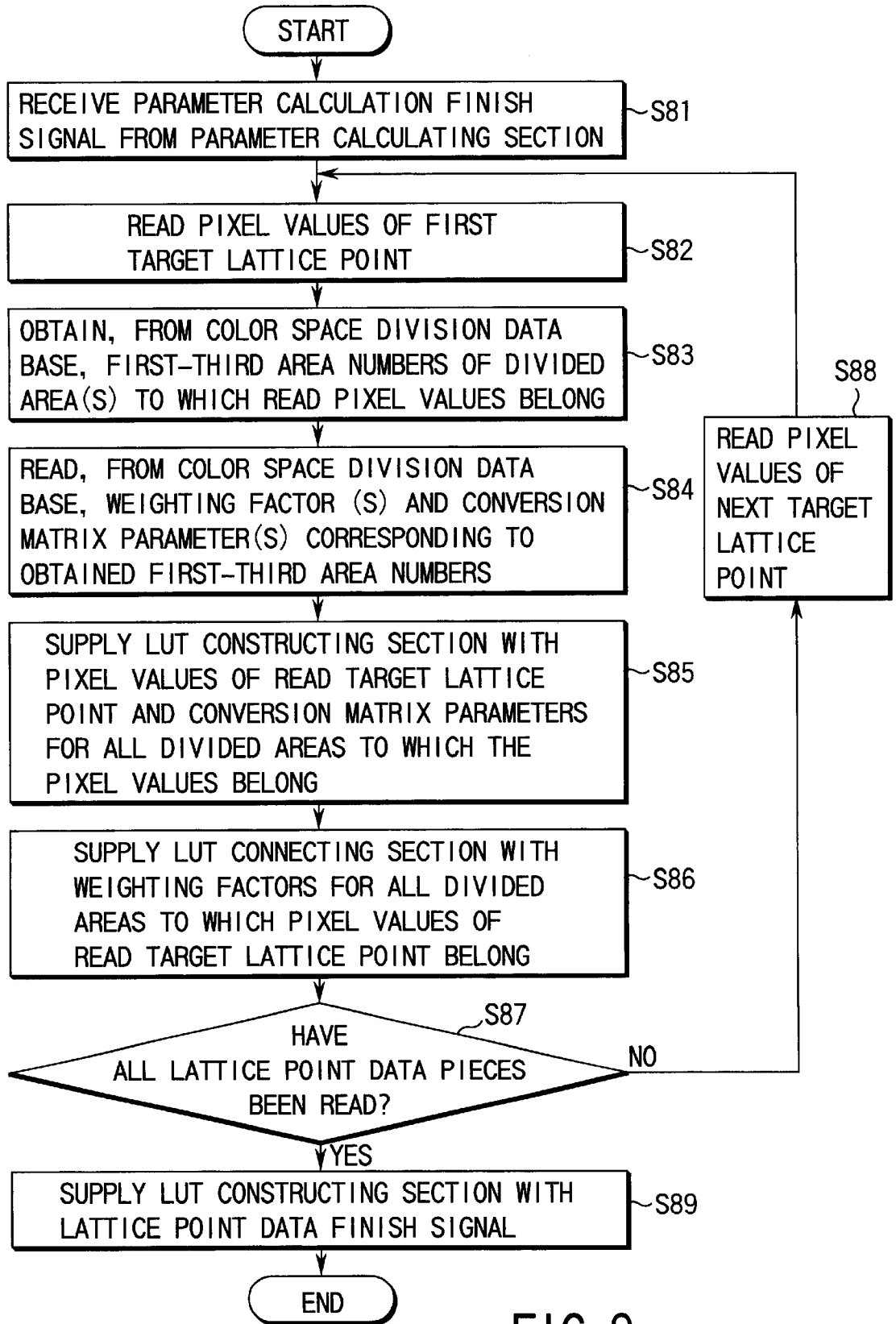
FIG. 9 is a flowchart useful in explaining the area determining procedure of an area determining section 8 at each lattice point of a lattice formed of squares of an equal size and set in the original color space.

Referring to the flowchart of FIG. 9, the operation of the area determining section 8 will be described. First, the area determining section 8 receives the parameter calculation finish signal from the parameter calculating section 7 located its upstream (step S81), and reads the RGB pixel values of a first lattice point that is included as a target lattice point in a lattice formed of squares of an equal size and set in the input color space (step S82). The area determining section 8 then determines the area numbers (the first, second and third area numbers) of all divided areas to which the RGB pixel belongs, on the basis of the first to third attributes of the pixel values of the read target lattice point, i.e. their brightness/chroma/hue values, in accordance with a similar procedure to the first to third color space division (see FIGS. 5–7) (step S83).

The area determining section 8 reads, from the color space division data base 3 of FIG. 4, conversion matrix parameters and weighting factors corresponding to the area numbers determined at the step S83 (step S84). The area determining section 8 then supplies the LUT constructing section 9 located downstream thereof with the pixel values of the target lattice point and all the conversion matrix parameters (step S85), and supplies the LUT connecting section 10 located downstream of the section 9 with the pixel values of the target lattice point and all the weighting factors (step S86).

The area determining section 8 repeats the processing at the steps S83–S86 for all the lattice points (steps S87 and S88), and supplies the LUT constructing section 9 located downstream thereof with a signal (a lattice point data finish signal) indicating that reading of the pixel values of all target lattice points has finished. The number of the lattice points is $256^3$ where the input color space is the RGB color space and each color element is expressed by 8-bit data.

Figure 10:
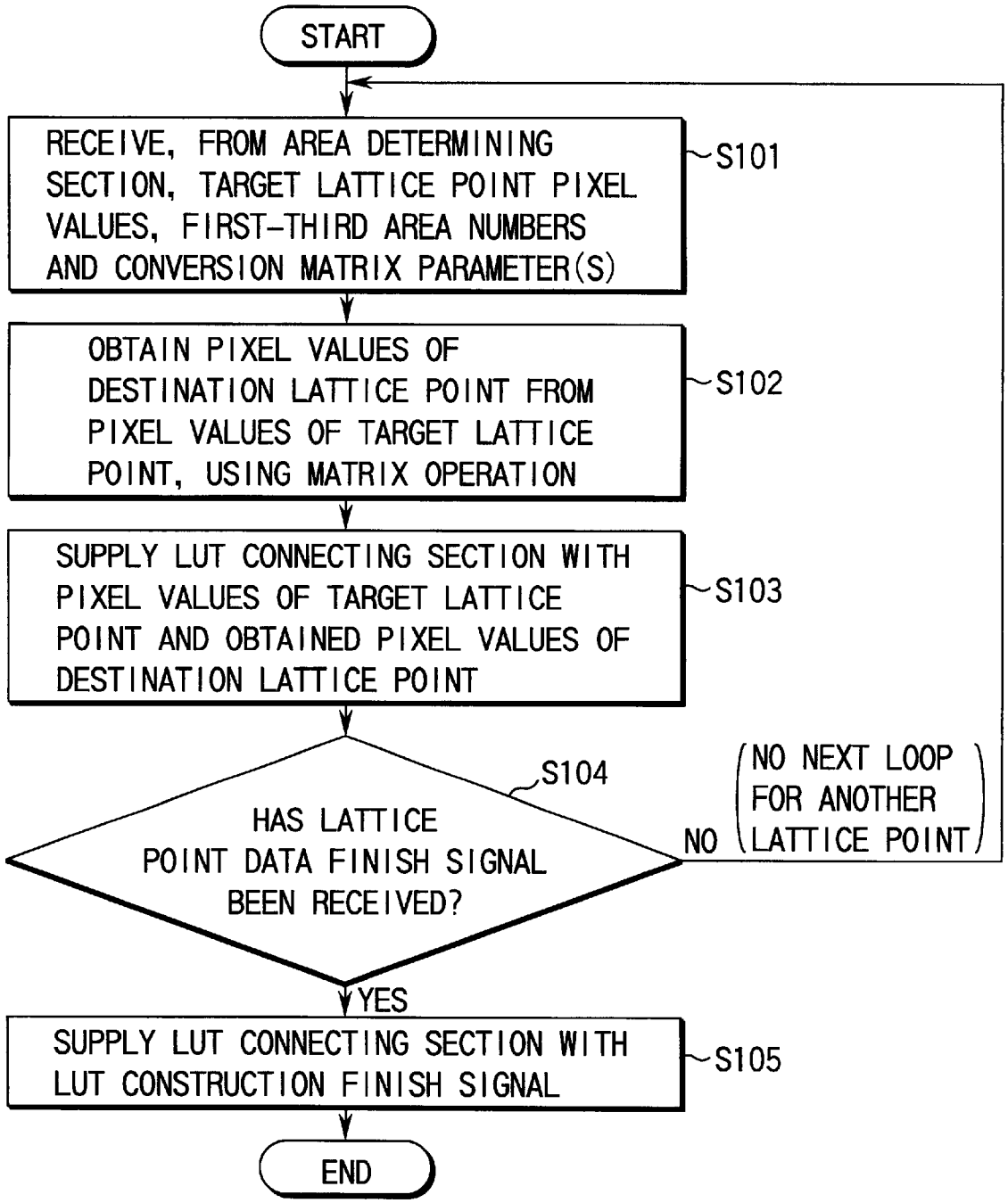
FIG. 10 is a flowchart useful in explaining LUT constructing means incorporated in an LUT constructing section 9 for constructing an LUT in each divided area of the original color space.

Referring to the flowchart of FIG. 10, the operation of the LUT constructing section 9 will be described. First, the LUT constructing section 9 obtains, using a matrix operation, the values of a destination pixel (or pixels) corresponding to the pixel values of a target lattice point, from the pixel values of the target lattice point and a conversion matrix parameter (or parameters) for a divided area (or areas) to which the target lattice point belongs (steps S101 and S102), the pixel values of the target lattice point and the conversion matrix parameter(s) being supplied from the area determining section 8. The LUT constructing section 9 then supplies the LUT connecting section 10 located downstream thereof with the pixel values of the target lattice point and the values of the corresponding destination pixel(s) (step S103). The LUT constructing section 9 repeats the processing at the steps S101–S103 for all the lattice points (step S104), and supplies the LUT connecting section 10 located downstream thereof with a signal (a LUT construction finish signal) indicating that the LUT construction by the matrix operation has finished.

Figure 11:
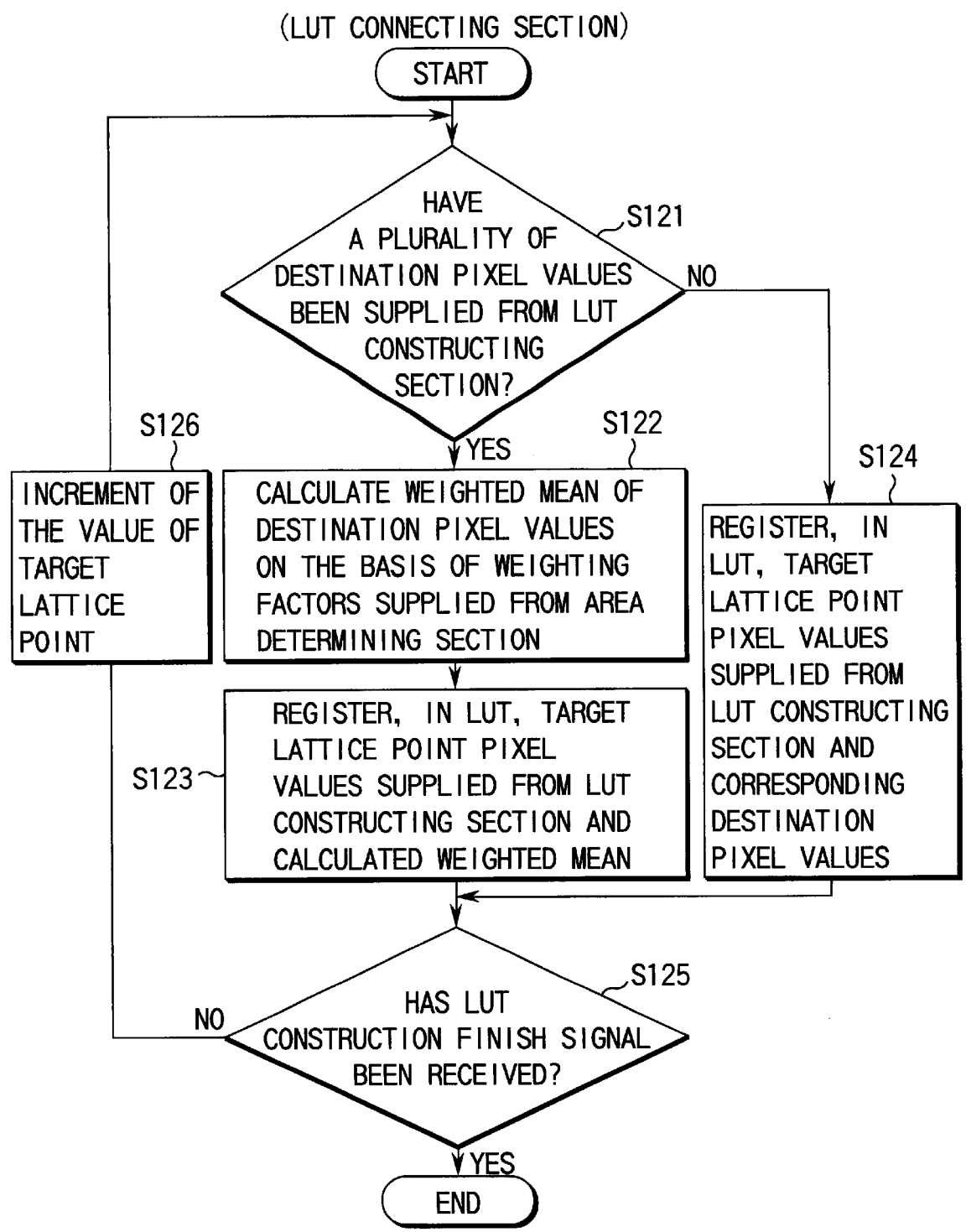
FIG. 11 is a flowchart useful in explaining a procedure of an LUT connecting section 10 for modifying and connecting an LUT constructed in each divided area of the original color space.
Figure 12:
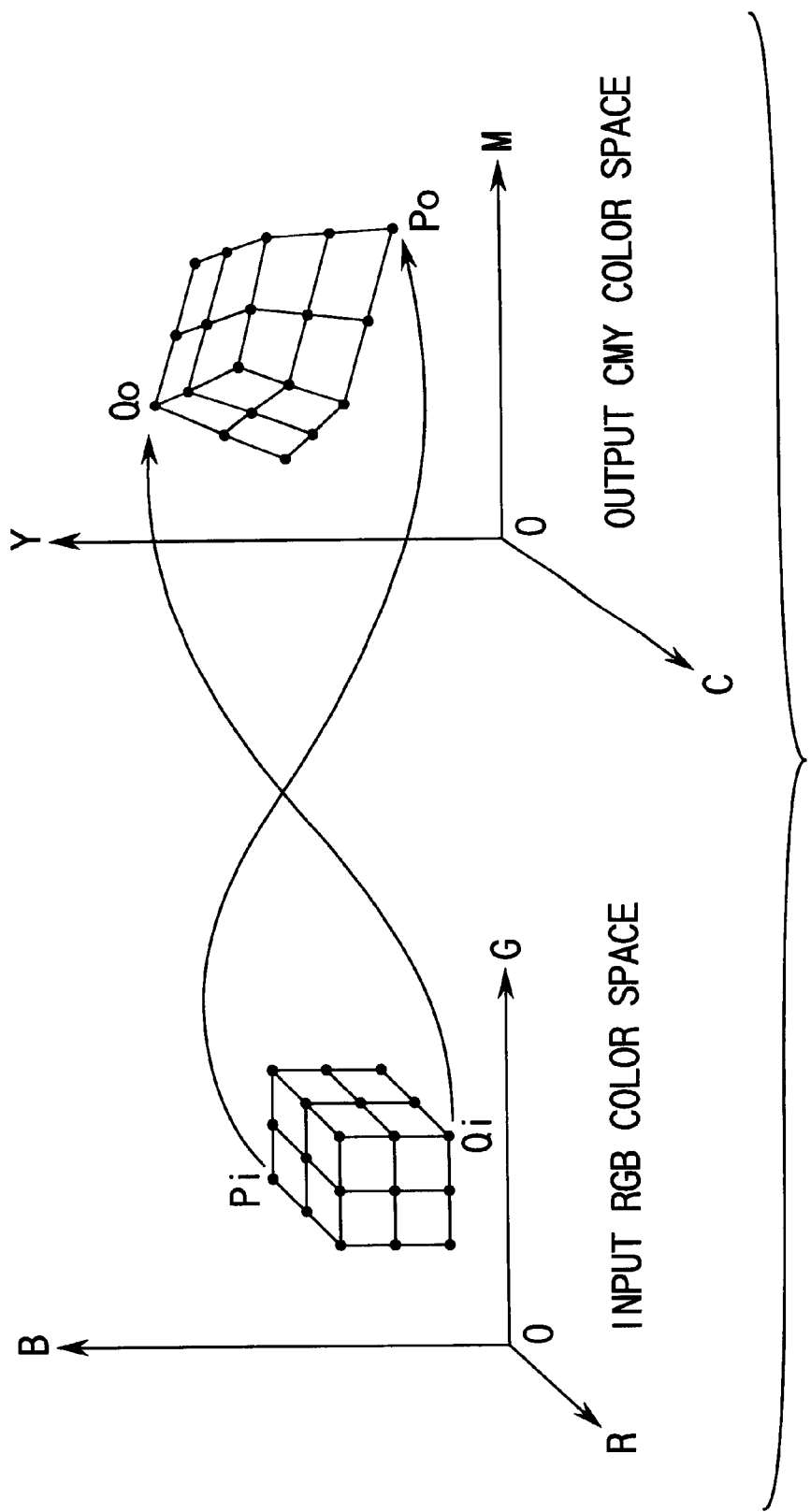
FIG. 12 is a view illustrating the concept of a table (LUT) that indicates color conversion correspondence between an input RGB color space and an output CMY color space.

Referring to the flowchart of FIG. 11, the operation of the LUT connecting section 10 will be described. First, if the values of a plurality of destination pixels are supplied from the LUT constructing section 9 for target lattice point supplied from the section 9 (step S121), the LUT connecting section 10 calculates the weighted mean of corresponding ones of the values of the destination pixels, using weighting factors supplied from the area determining section 8 (step S122). The LUT connecting section 10 supplies the image processing section 1 with the weighted mean as the values of a destination pixel corresponding to the target lattice point, and registers them in the LUT 1c (step S123). If a single destination pixel is supplied from the LUT constructing section 9 for a target lattice point (step S121), the LUT connecting section 10 supplies the image processing section 1 with the values of the destination pixel as destination pixel values corresponding to the pixel values of the target lattice point, and registers them in the LUT 1c n(step S124). The processing at the steps S121–S124 is repeated until the LUT connecting section 10 receives the LUT construction finish signal from the LUT constructing section 9 (steps S125 and S126).

The LUT connecting section 10 executes the processing at the steps S121–S123 each time it receives, from the LUT constructing section 9, the pixel values of each target lattice point and all the values of a destination pixel (pixels) corresponding thereto, and also receives, from the area determining section 8, the values of each target lattice point and all corresponding weighting factors.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of constructing a look-up table to be referred to when converting color information of a lattice point in a first color space, into color information of a lattice point in a second color space, comprising the steps of:

defining first divided areas by dividing the first color space on the basis of one of color attributes and at least one optionally designated first reference value;

defining second divided areas by dividing each of the first divided areas on the basis of one of color attributes and at least one optionally designated second reference value;

calculating and providing an appropriate conversion matrix parameter for each of the second divided areas, the appropriate conversion matrix parameter being used to execute conversion from the first color space to the second color space; and constructing, using the provided conversion matrix parameters, a look-up table that indicates a correspondence relationship between lattice points in the first color space and lattice points in the second color space.

2. A method according to claim 1, wherein the step of defining the first divided areas includes the step of dividing the first color space on the basis of a first attribute that is one of brightness, chroma and hue as color three attributes, and the step of defining the second divided areas includes the step of dividing each of the first divided areas on the basis of a second attribute that is one of the brightness, the chroma and the hue as the color three attributes.

3. A method according to claim 2, wherein the step of defining the second divided areas includes the step of dividing each of the first divided areas on the basis of the second attribute that is one of the brightness, the chroma and the hue as the color three attributes and differs from the first attribute, and further comprising the step of defining third divided areas by dividing each of the second divided areas, using at least one optionally designated third reference value, on the basis of a third attribute that is one of the brightness, the chroma and the hue as the color three attributes and differs from the first and second attributes, the step of calculating the conversion matrix parameter including the step of calculating an appropriate conversion matrix parameter for each of the third divided areas, the appropriate conversion matrix parameter being used to execute conversion from the first color space to the second color space.

4. A method according to claim 3, wherein:

the step of defining the first divided areas includes the step of dividing the first color space into a highlight area, a middle-brightness area and a dark area, using two brightness reference values;

the step of defining the second divided areas includes the step of dividing the middle-brightness area into a chromatic color area and an achromatic area, using one chroma reference value; and the step of defining the third divided areas includes the step of dividing the chromatic area into a plurality of areas, using at least one hue reference value.

5. A method according to claim 1, wherein:

the step of defining the first divided areas includes the step of dividing the first color space into a plurality of areas such that an overlapping area is formed between adjacent divided areas;

the step of calculating the appropriate conversion matrix parameter includes the step of calculating and providing appropriate conversion matrix parameters and weighting factors for those respective ones of the second divided areas, to which a target lattice point belongs; and the step of constructing the look-up table includes the step of calculating, when a plurality of conversion matrix parameters and weighting factors are provided for one target lattice point, color information used in the second color space and corresponding to the one target lattice point, using the conversion matrix parameters and the weighting factors.

6. A method of constructing a look-up table to be referred to when converting color information of a lattice point in a first color space represented by an RGB color system, into color information of a lattice point in a second color space, comprising the steps of:

dividing the first color space into a plurality of areas on the basis of a difference between a maximum value and a minimum value included in RGB color values of each lattice point, and at least one optionally designated reference value;

calculating an appropriate conversion matrix parameter for each of the divided areas, the appropriate conversion matrix parameter being used to execute conversion from the first color space to the second color space; and constructing, using the calculated conversion matrix parameters, a look-up table that indicates, for each of the divided areas, a correspondence relationship between lattice points in the first color space and lattice points in the second color space.

7. A method according to claim 6, wherein the step of dividing the first color space includes the step of defining three areas by defining a dark area that includes a lattice point whose RGB color maximum value is lower than an optionally designated first reference value, and also defining a highlight area that includes a lattice point whose RGB color minimum value is higher than an optionally designated second reference value higher than the first reference value.

8. A color conversion apparatus for constructing a look-up table to be referred to when converting color information of a lattice point in a first color space, into color information of a lattice point in a second color space, and for converting color information in the first color space into color information in the second color space with reference to the constructed look-up table, comprising:

first defining means for defining first divided areas by dividing the first color space on the basis of one of color attributes and at least one optionally designated first reference value;

second defining means for defining second divided areas by dividing each of the first divided areas defined by the first defining means, on the basis of one of color attributes and at least one optionally designated second reference value;

calculation means for calculating an appropriate conversion matrix parameter for each of the second divided areas defined by the second defining means, the appropriate conversion matrix parameter being used to execute conversion from the first color space to the second color space;

LUT constructing means for constructing a look-up table for each of the second divided areas, using the calculated conversion matrix parameter; and means for converting color information in the first color space into color information in the second color space with reference to the look-up table constructed by the LUT constructing means.

9. An apparatus according to claim 8, wherein:

the first defining means includes means for dividing the first color space on the basis of a first attribute that is one of brightness, chroma and hue as color three attributes, using the first reference value; and the second defining means includes means for dividing each of the first divided areas on the basis of a second attribute that is one of the brightness, the chroma and the hue as the color three attributes, using the second reference value.

10. An apparatus according to claim 8, wherein:

the first defining means includes means for dividing the first color space into a plurality of areas such that an overlapping area is defined between each set of adjacent ones of the first divided areas;

the matrix parameter calculation means includes means for calculating and providing weighting factors and conversion matrix parameters for those respective ones of the second divided areas, to which a target lattice point belongs; and the LUT constructing means includes means for calculating, when a plurality of conversion matrix parameters and weighting factors are provided for one target lattice point, color information used in the second color space and corresponding to the one target lattice point, using the conversion matrix parameters and the weighting factors.

* * * * *